(12) United States Patent
Gondek et al.

(10) Patent No.: US 7,561,316 B2
(45) Date of Patent: Jul. 14, 2009

(54) ADJUSTING INK-USAGE PARAMETERS TO REDUCE INK USAGE

(75) Inventors: Jay S. Gondek, Camas, WA (US); Morgan T. Schramm, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 11/036,821

(22) Filed: Jan. 15, 2005

(65) Prior Publication Data

US 2006/0158673 A1    Jul. 20, 2006

(51) Int. Cl.
*B41J 2/175* (2006.01)
(52) U.S. Cl. .................. 358/504; 358/1.1; 358/500; 358/501; 358/502; 399/9; 399/16; 399/23; 399/24; 399/25; 347/1; 347/85; 347/86
(58) Field of Classification Search ............ 358/1.1, 358/1.13, 500, 501, 502
See application file for complete search history.

(56) References Cited

U.S. PATENT DOCUMENTS

| | | | | |
|---|---|---|---|---|
| 4,046,566 A * | 9/1977 | Marthaler | ............ | 430/217 |
| 5,349,377 A * | 9/1994 | Gilliland et al. | ............ | 347/131 |
| 5,459,556 A * | 10/1995 | Acquaviva et al. | ............ | 399/58 |
| 5,710,827 A * | 1/1998 | Perumal et al. | ............ | 382/167 |
| 5,797,061 A * | 8/1998 | Overall et al. | ............ | 399/27 |
| 6,275,664 B1 * | 8/2001 | Wolf et al. | ............ | 399/8 |
| 6,626,529 B1 * | 9/2003 | King et al. | ............ | 347/104 |
| 6,672,695 B1 * | 1/2004 | Naka et al. | ............ | 347/7 |
| 6,761,427 B1 * | 7/2004 | Owen et al. | ............ | 347/19 |
| 6,977,742 B2 * | 12/2005 | Harper | ............ | 358/1.15 |
| 6,996,347 B2 * | 2/2006 | Ito et al. | ............ | 399/12 |
| 2001/0033314 A1 * | 10/2001 | Yoshino et al. | ............ | 347/86 |
| 2002/0140959 A1 * | 10/2002 | Harper | ............ | 358/1.13 |
| 2003/0025741 A1 * | 2/2003 | Maeda | ............ | 347/7 |
| 2003/0043401 A1 * | 3/2003 | Abel et al. | ............ | 358/1.14 |
| 2003/0059222 A1 * | 3/2003 | Brown et al. | ............ | 399/23 |
| 2004/0196331 A1 | 10/2004 | Zerza et al. | | |
| 2005/0063749 A1 * | 3/2005 | Harris et al. | ............ | 400/62 |
| 2005/0068553 A1 * | 3/2005 | Otake et al. | ............ | 358/1.9 |

FOREIGN PATENT DOCUMENTS

| | | |
|---|---|---|
| EP | 0878745 | 11/1998 |
| EP | 0878745 A2 | 11/1998 |
| GB | 2382905 A * | 6/2003 |
| GB | 2382905 A1 | 11/2003 |
| JP | 08275010 A | 10/1996 |
| JP | 2003-291324 | 10/2003 |
| JP | 2003-291324 A | 10/2003 |
| JP | 2005001275 A | 1/2005 |

OTHER PUBLICATIONS

British Search Report dated May 4, 2006.
Japanese Office Action in corresponding JP patent application 2006-007912, dated Sep. 26, 2008.

* cited by examiner

*Primary Examiner*—Mark K Zimmerman
*Assistant Examiner*—Kent Yip (57) ABSTRACT

One or more ink-usage parameters are adjusted based on ink remaining and historical ink usage, to reduce ink usage for an image to be printed on a sheet of media with ink. The image is printed on the sheet of media with the ink, in accordance with the ink-usage parameters. Adjustment of ink-usage parameters and printing an image on a sheet of media with the ink are repeated for each additional image to be printed on a sheet of media.

34 Claims, 5 Drawing Sheets

ADJUSTING INK-USAGE PARAMETERS TO REDUCE INK USAGE

BACKGROUND

Inkjet printers are a popular way to print images on sheets of media, either in black and white or in color. For color images in particular, inkjet printers typically work by having a number of supplies of differently colored ink, such as cyan, magenta, and yellow, which are combined in different ways to yield a wide gamut of different colors. Many inkjet printers have a single cartridge that includes supplies of all these differently colored inks, and another cartridge that includes a supply of black ink. Some specialized inkjet printers have a single cartridge that includes supplies of differently colored inks, optionally a supply of black ink, and even a number of media sheets on which images are to be printed.

For this latter type of printer, the supplies of differently colored inks and the optional supply of black ink are desirably sufficient to allow users to print on all the media sheets included in the cartridge. If there is an insufficient amount of any of the inks, the user may be unable to print on all the media sheets supplied in the cartridge. Similarly, for inkjet printers that use a single cartridge that include supplies of differently colored inks, one color of ink may run out before the other colors of ink, necessitating the insertion of a brand-new cartridge into an inkjet printer. For example, there may be some cyan and magenta ink remaining, but the yellow ink may have run out, necessitating insertion of a brand-new cartridge having full supplies of cyan, magenta, and yellow inks.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
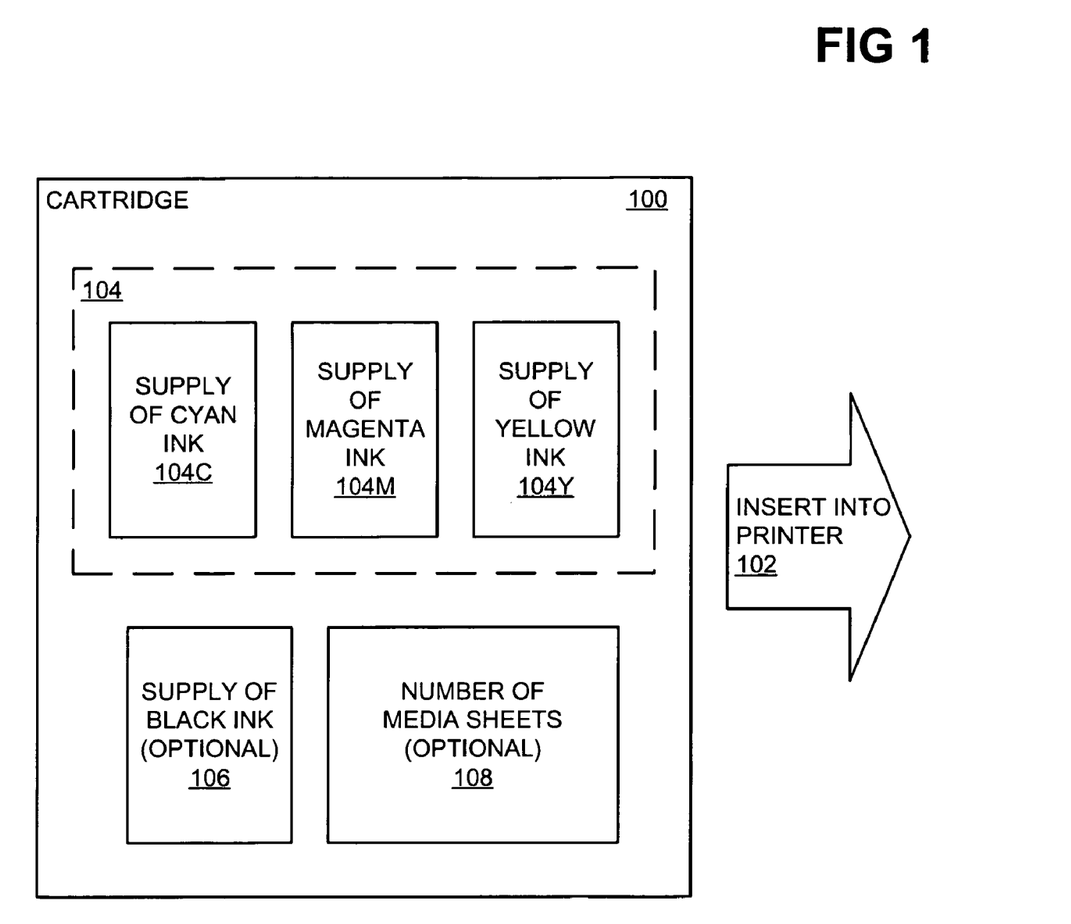
FIG. 1 is a block diagram of a cartridge that includes supplies of a number of differently colored inks, and optionally a supply of sheets of media on which images are to be printed using the inks, according to an embodiment of the invention.

FIG. 1 shows a block diagram of a cartridge 100 for insertion into an inkjet printer, as indicated by the arrow 102, according to an embodiment of the invention. The cartridge 100 includes at least supplies 104 for a number of differently colored inks. For example, as depicted in FIG. 1, the supplies 104 include a supply 104C of cyan ink, a supply 104M of magenta ink, and a supply 104Y of yellow ink. The term ink is used generally herein, and encompasses any type of pigment or colorant that is used in conjunction with printers to print images on sheets of media, such as inkjet printers. Although the supplies 104 are depicted as included supplies 104C, 104M, and 104Y of cyan, magenta, and yellow ink, respectively, in different embodiments the supplies 104 may include supplies of ink of other colors, in addition to and/or in lieu of those depicted in FIG. 1.

The cartridge 100 may also optionally include a supply 106 of black ink, as well as a number of media sheets 108 on which images are to be printed by the printer in which the cartridge 100 is inserted. In this embodiment in particular, the cartridge 100 may also be referred to as a cassette, including both supplies 104 and 106 of ink, and media sheets 108. Furthermore, the cartridge 100 is intended in one embodiment as a non-user serviceable and non-user replenishable cartridge. That is, when any of the colored ink supplies 104 run out, or when the black ink supply 106 or the media sheets 108 run out when they are present, the intention is for the user to remove the cartridge 100 from the printer in question, and replace it with another instance of the same cartridge. In other words, the intention is not for the user to just replenish the supply of ink in question that has run out, or replenish just the media sheets 108 that have run out, and still use the same cartridge in the printer.

Embodiments of the invention are directed to adjusting ink-usage parameters to reduce ink usage. In particular, some embodiments of the invention are directed to balancing ink usage so that there is a sufficient amount of all the ink supplies 104 and 106 to print images on all the media sheets 108 within the cartridge 100, where the black ink supply 106 and the media sheets 108 are present within the cartridge 100. Other embodiments of the invention are directed to balancing ink usage so that the ink supplies 104 all run out at substantially the same time, where the black ink supply 106 and/or the media sheets 108 are not present within the cartridge 100. A method for achieving the former is first described, and then a method for achieving the latter is described, after which a general method encompassing both embodiments of the invention is described.

Figure 2:
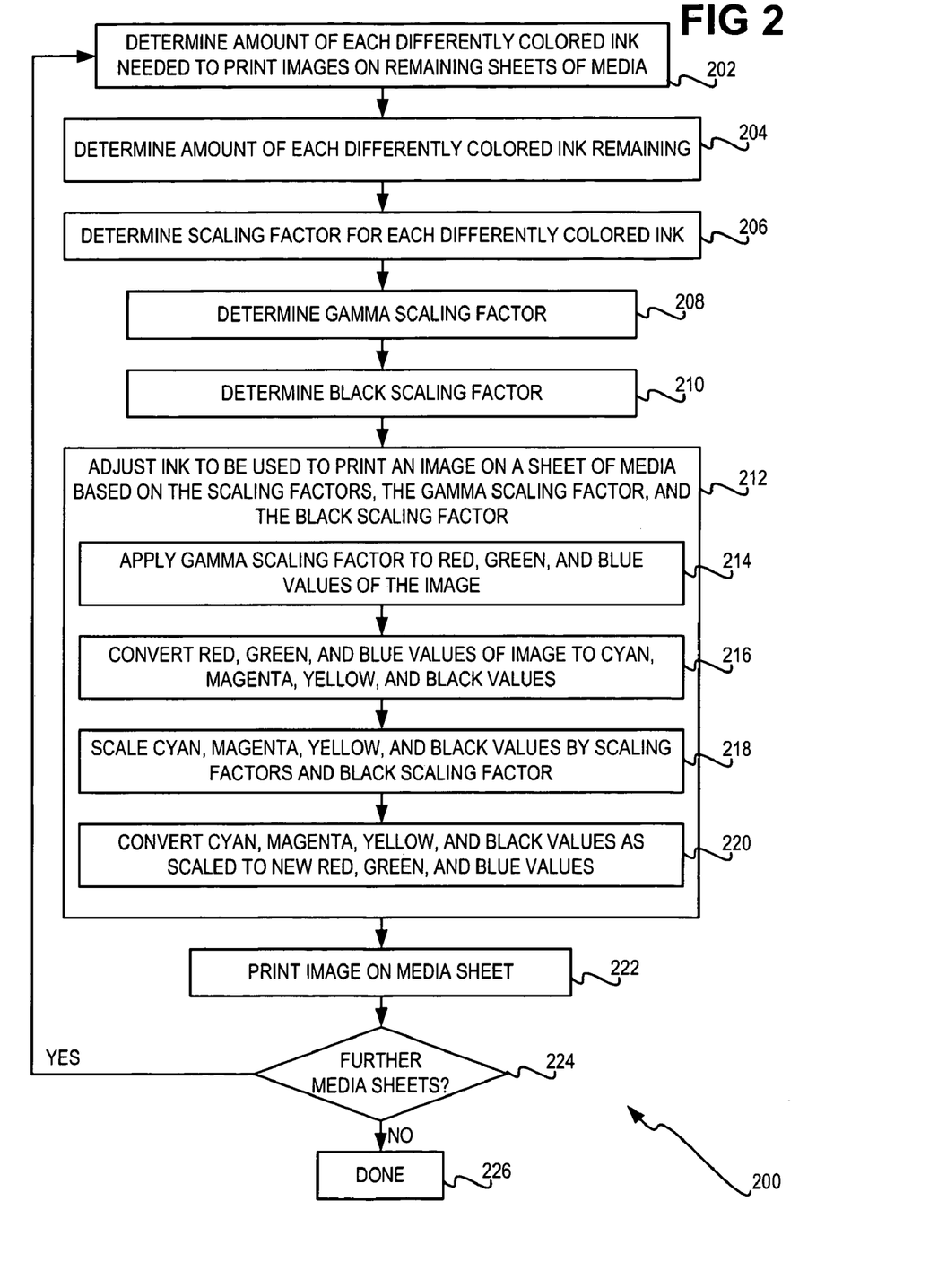
FIG. 2 is a flowchart of a method for adjusting ink-usage parameters to reduce or balance ink usage so that there is sufficient ink to print on a predetermined number of media sheets, according to an embodiment of the invention.

FIG. 2 shows a method 200 for adjusting or balancing ink usage so that there is a sufficient amount of all the ink supplies, including black ink if it is present, and differently colored inks like cyan ink, magenta ink, and yellow ink, to print images on all of a predetermined number of a media sheets, according to an embodiment of the invention. The method 200 may be implemented in whole or in part as a computer program having one or more computer program parts, such as different subroutines, modules, sections, objects, and so on. Such a computer program may be performed by a host computing device to which an inkjet printing device is communicatively coupled, such as a desktop or laptop computer, or even a digital camera device. The computer program may also be performed by the printing device itself. The method 200 may in one embodiment be implemented in relation to the cartridge 100 of FIG. 1, in the embodiment of the invention where the cartridge 100 includes the ink supplies 104, the black ink supply 106, and a predetermined number of the media sheets 108.

First, the amount of each differently colored ink, including black ink if it is present, needed to print images on the remaining sheets of media is determined (202). For example, there may have initially been 25 sheets of media, and currently 20 sheets of media remain. One or more of the following approaches may be used to determine the amounts of the inks needed to print images on the remaining sheets of media. First, for each differently colored ink, including black ink if it is present, the initial amount of ink supplied before any of the sheets of media had images printed thereon is multiplied by the number of remaining sheets of media, and divided by the initial number of media sheets provided, to yield the amount of ink needed to print images on the remaining sheets of media.

Second, for each differently colored ink, including black ink if it is present, the amount of ink needed may be determined based on the past or historical printing of prior images on media sheets. For example, it may be determined that on average, C amount of cyan ink, M amount of magenta ink, Y amount of yellow ink, and K amount of black has been used to print an image on each media sheet, historically. Therefore, the amounts C, M, Y, and K are multiplied by the number of media sheets remaining to determine the amount of each differently colored ink, including black ink, needed to print images on the remaining sheets of media.

In either approach used, the amounts of ink needed may be "padded" or increased to compensate for greater amounts of ink actually being needed to print images on the remaining sheets of media. For example, the amounts of ink needed as has been determined may each be multiplied by a padding factor, such as 110% percent. As another example, the approaches that have been described may be used to determine the amounts of ink needed based on the actual number of remaining sheets of media, plus a compensating factor. For example, there may be 20 actual remaining media sheets, but the approaches determine the amounts of ink needed to print images on these actual 20 remaining media sheets by presuming that there are 20+S media sheets, where S may be 0.5, 1, or a different number.

Next, the amount of each differently colored ink, including black ink if it is present, remaining is determined (204). In one embodiment, the ink usage for each differently colored ink, including black ink if it is present, is tracked as images are printed on media sheets Therefore, the amount of each ink remaining can be determined by subtracting the ink already consumed from the initial amount of ink present before any images were printed on media sheets. For example, with respect to cyan ink in particular, there may initially be an amount $C_0$ of cyan ink before any images are printed on media sheets with this cyan ink. Further, an amount $C_1$ of cyan ink may have been consumed already in printing images thus far on media sheets. Therefore, the amount of cyan ink remaining is equal to $C_0$ minus $C_1$.

A scaling factor is determined for each differently colored ink, but not including black ink in particular, even if black ink is present (204). The scaling factor is a number from 0 to 100% that is later used to balance or reduce ink usage for a given differently colored ink. The scaling factor for each differently colored ink is based on the amount of ink needed and the amount of ink remaining for the differently colored ink in question. For example, with respect to cyan ink in particular, the scaling factor can be the ratio of the amount of cyan ink remaining, divided by the amount of cyan ink needed to print images on the remaining media sheets, where this factor is limited to zero at the lower end, and to one or 100% at the upper end.

Next, a gamma scaling factor is determined (208). The gamma scaling factor is used to scale the gamma value of images printed on media sheets, where the gamma value is a numerical value representing the amount of mid-tone lightening or darkening of the images that is to occur when printed on the media sheets. The gamma scaling factor is based on the scaling factors of the differently colored inks, and specifically not including black ink even if it is present. In one embodiment, the gamma scaling factor is defined as the maximum scaling factor of any of the scaling factors for the differently colored inks, not including black ink, plus the minimum scaling factor of any of the scaling factors for the differently colored inks, not including black ink even if it is present, with the resulting sum divided by two. For example, the scaling factors for cyan, magenta, and yellow ink may be 0.5, 0.7, and 0.4, respectively. The gamma scaling factor is thus determined in this example as 0.7 plus 0.4, or 1.1, divided by two, or 0.55.

A black scaling factor is also determined (210). The black scaling factor is a number from 0 to 100% that is later used to balance or reduce ink usage for black ink in particular where black ink is present, or for all of the other colored inks that in combination make up black where black ink is not present. That is, because approximately or at least substantially equal amounts of cyan, magenta, and yellow ink, for instance, in combination make black, the black scaling factor can be later used to reduce ink usage of all these differently colored inks, even where black ink is not present. In one embodiment, the black scaling factor is determined in the same way that the gamma scaling factor is determined. That is, the black scaling factor is defined as the maximum scaling factor of any of the scaling factors for the differently colored inks, not including black ink, plus the minimum scaling factor of any of the scaling factors for the differently colored inks, not including black ink even if it is present, with the resulting sum divided by two.

The ink to be used to print specifically the next image on the next sheet of media is now adjusted, based on the scaling factors that have been determined, including the gamma scaling factor and the black scaling factor (212). The image to be printed is defined as a collection of pixels, where each pixel has a red value, a green value, and a blue value. First, the gamma scaling factor is applied to the red value, the green value, and the blue value of each pixel of the image (214). In one embodiment, the red values, the green values, and the blue values of the image are normalized to values between 0 and 1. For example, if each of these values can have a minimum value of 0, and a maximum value of 255, then each value is divided by 255 to obtain a normalized value between 0 and 1. The gamma scaling factor is applied to lighten mid-tones of the image to be printed on the next media sheet.

Next, the red, green, and blue values of the image, as to which the gamma scaling value has already been applied, are converted to cyan, magenta, yellow, and black values (216). For example, the red value, the green value, and the blue value of each pixel of the image are converted to corresponding cyan, magenta, yellow, and black values. The red, green, and blue values of each pixel are converted to corresponding cyan, magenta, yellow, and black, values, even if black ink is not present. This is because black can be achieved by combining approximately or at least substantially equal amounts of cyan, magenta, and yellow ink. Where the red, green, and blue values were already normalized to values between 0 and 1, such conversion can be performed as follows. First, the cyan value for each pixel is determined as one minus the red value of the pixel, the magenta value for each pixel is determined as one minus the green value of the pixel, and the blue value for each pixel is determined as one minus the blue value of the pixel. Next, for each pixel, at least a portion of the minimum value of the cyan, magenta, and yellow values is set equal to the black value for the pixel, and is subtracted from each of the cyan, magenta, and yellow values of that pixel.

For example, the red, green, and blue values for a given pixel may have the normalized values 0.4, 0.5, and 0.6. The cyan, magenta, and yellow values for this pixel are initially determined as 1-0.4=0.6, 1-0.5=0.5, and 1-0.6=0.4, respectively. The minimum value of the cyan=0.6, magenta=0.5, and yellow=0.4 values is 0.4. Therefore, in one embodiment the black value for the pixel may be set equal to 0.4, with the cyan, magenta, and yellow values for the pixel adjusted by subtracting 0.4 from each value, resulting in cyan=0.2, magenta=0.1, and yellow=0.0.

The subtracting of the minimum value of the cyan, magenta, and yellow values to yield the black values of the image is referred to as extracting the black values from the color values of the image. In the example that has been described, maximum black extraction was accomplished, because at least one of the remaining cyan, magenta, and yellow values was equal to zero. In other embodiments of the invention, partial black extraction may be accomplished, so that all of the remaining cyan, magenta, and yellow values are greater than zero.

For example, rather than extracting for a given pixel all of the minimum value of the cyan, magenta, and yellow values for maximum extraction of the black value, only a percentage or an upper limit of the minimum value of the cyan, magenta, and yellow values may be extracted as the black value, to yield partial black extraction. In one embodiment, 60% of the minimum value of the cyan, magenta, and yellow values for each pixel is extracted as the black value for the pixel. That is, no more than 0.60 of the cyan, magenta, and yellow values for each pixel is extracted as the black value for the pixel.

The method 200 next scales the cyan, magenta, yellow, and black values for each pixel that have been determined by their corresponding scaling factors (218). For example, the scaling factors for cyan, magenta, yellow, and black may be the values C, M, Y, and K. The cyan, magenta, yellow, and black values for a given pixel may be the values c, m, y, and k. Therefore, the values c, m, y, and k are scaled by the scaling factors C, M, Y, and K by multiplication, such that the cyan, magenta, yellow, and black values $c*C$, $m*M$, $y*Y$, and $k*K$ result. As has been mentioned, it is again noted that the black value for each pixel is determined even where there is no black ink. That is, black can be achieved by combining approximately or at least substantially equal amounts of cyan, magenta, and yellow ink, such that scaling the black value for each pixel is useful even where no black ink is present, because black value scaling reduces usage of cyan, magenta, and yellow ink equally.

The scaled cyan, magenta, yellow, and black values for each pixel of the image to be printed on the next media sheet are finally converted back to red, green, and blue values (220). For example, normalized red, green, and blue values can be determined for a given pixel by first adding the black value to each of the cyan, magenta, and yellow values, and then by subtracting the resulting sum from one. More specifically, to obtain the normalized red value for a given pixel, the sum of the cyan value and the black value is subtracted from one; to obtain the normalized green value for the pixel, the sum of the magenta value and the black value is subtracted from one; and, to obtain the normalized blue value for the pixel, the sum of the yellow value and the black value is subtracted from one.

The image is then printed on a media sheet (222). Printing of the image on the media sheet by a particular printing device may and typically will involve further conversion of the red, green, and blue values of the image, as have been modified, to cyan, magenta, yellow, and optionally black values, as specifically dictated by that particular printing device. That is, the modification of the red, green, and blue values of the image as performed in 212 to reduce or balance ink usage is performed prior to the actual approach by which a specific printing device converts the red, green, and blue values to cyan, magenta, yellow, and optionally black values for actually printing the image on a media sheet in 222.

Thus, the ink adjustment performed in 212 is independent of any specific inkjet printer, and independent of the manner by which a given inkjet printer actually and subsequently converts the modified red, green, and blue values of an image to cyan, magenta, yellow, and optionally black values for printing purposes in 222. Thus, the adjustment performed in 212 may in one embodiment be performed by a host computing device to which a given inkjet printing device is communicatively coupled, without knowledge of how the specific inkjet printing device in question performs color conversion for printing purposes. Furthermore, the approach described for ink adjustment can be incorporated in inkjet printing devices without having to modify the approach for the specific manner by which a given inkjet printing device performs color conversion.

Finally, if there are further media sheets on which images are to be printed (224), then the method 200 is repeated for each additional media sheet, prior to printing an image on the next media sheet. That is, the method 200 is self-correcting, because the ink adjustment performed in 212 is performed before each media sheet has an image printed on it. If a given image consumes more than the determined amount of ink for a given color, then the method 200 will compensate for this extra ink consumption the next time the method 200 is repeated, before the next image is printed on a media sheet. Once the final media sheet is printed, the method 200 is finished (226).

It is noted that the ink adjustment performed in 212 of the method 200 is accomplished without pre-scanning the image to be printed on the next sheet of media. That is, the image to be printed on the next sheet of media is scaled based on scaling factors that are not specific to the particular content of the image. The image is not initially scanned to determine the actual colors contained in the image, and thus the image is not initially scanned to determine the actual amount of each differently colored ink, including black ink that will be consumed in printing the image on a media sheet. Rather, the scaling factors are determined based on historical ink consumption and usage. Not having to pre-scan the image to be printed on the next sheet of media affords the method 200 with performance advantages as compared to as if image pre-scanning were instead accomplished.

Figure 3:
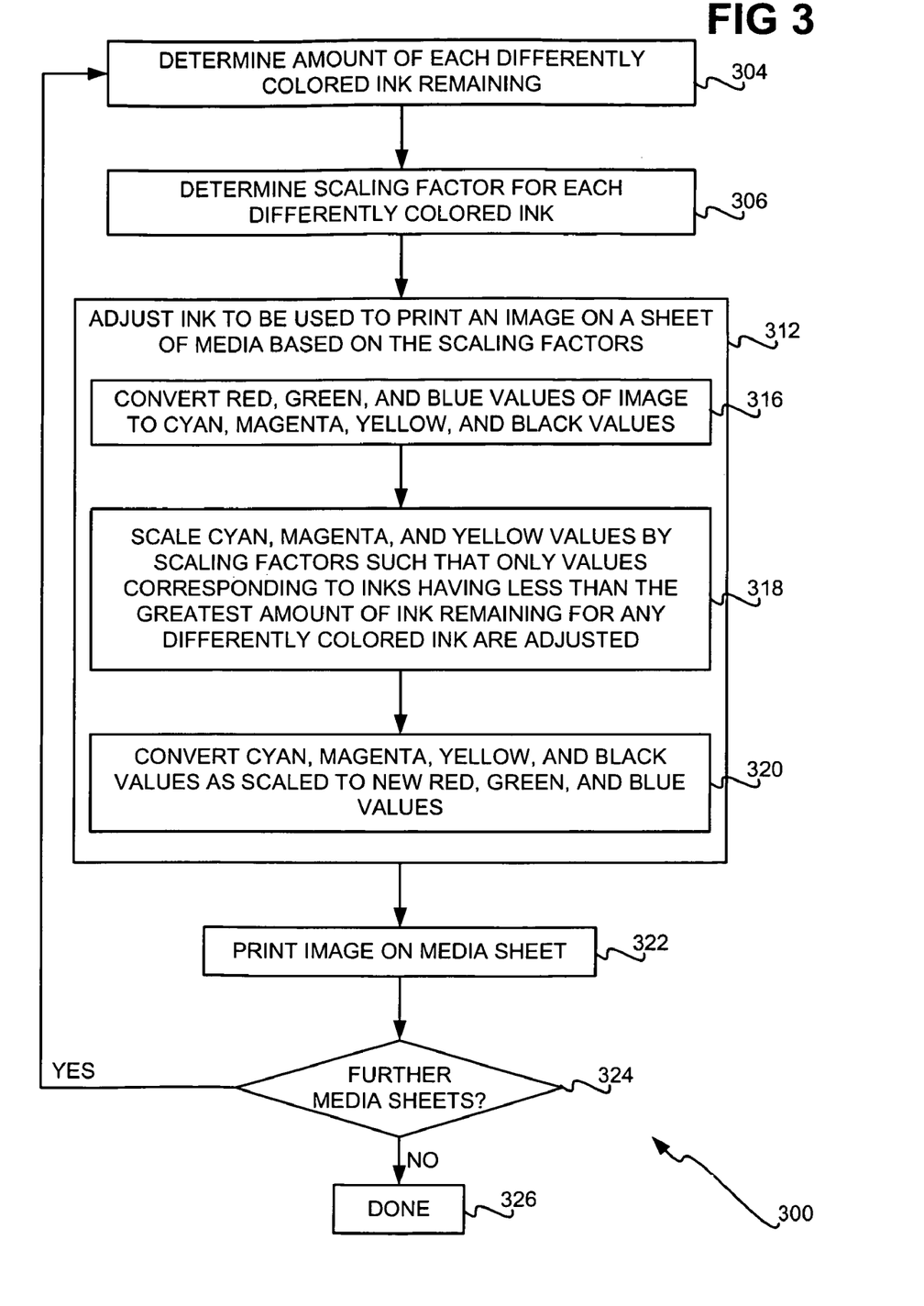
FIG. 3 is a flowchart of a method for adjusting ink-usage parameters to reduce or balance ink usage so that the supplies of a number of differently colored inks all substantially run out at the same time, according to an embodiment of the invention.

FIG. 3 shows a method 300 for adjusting or balancing ink usage so that a number of different ink supplies, such as all of the cyan ink, magenta ink, and yellow ink, that may be in a single cartridge substantially run out at the same time, according to an embodiment of the invention. Like the method 200 of FIG. 2, the method 300 may be implemented in whole or in part as a computer program. The computer program may be performed by a host computing device to which a printing device is communicatively coupled, or by the printing device itself. The method 300 may in one embodiment be implemented in relation to the cartridge 100 of FIG. 1, in the embodiment where the cartridges includes at least the ink supplies 104.

First, for each differently colored ink, not necessarily including black ink, the amount of ink remaining is determined (304). The amount of ink remaining may be determined as has been described in relation to 204 of the method 200 of FIG. 2. Next, a scaling factor is determined for each differently colored ink, not necessarily including black ink if it is not present in the same cartridge, such that black ink usage does not have to be balanced with the usage of the other colored inks (306). The scaling factor is a number from 0 to 100% that is later used to balance or reduce ink usage for a given differently colored ink. The scaling factor for each differently colored ink is based on the amount of ink remaining of that differently colored ink, and the maximum amount of ink remaining for any of the differently colored inks. For example, there may be C amount of cyan ink remaining, M amount of magenta ink remaining, and Y amount of yellow ink remaining, where as one example C is greater than M, and M is greater than Y. Therefore, the scaling factor for cyan ink is the ratio of C to C, or C/C, the scaling factor for magenta ink is the ratio M to C, or M/C, and the scaling factor for yellow ink is the ratio Y to C, or Y/C.

The ink to be used to print specifically the next image on the next sheet of media is now adjusted, based on the scaling factors that have been determined (312). As before, the image to be printed is defined as a collection of pixels, where each pixel has a red value, a green value, and a blue value. The red, green, and blue values of the image are converted to cyan, magenta, yellow, and black values (316). The red, green, and blue values can in one embodiment first be normalized, such that they can be converted to cyan, magenta, yellow, and black values as has been described in relation to 216 of the method 200 of FIG. 2. Such conversion can therefore include an at least partial extraction of black values from the cyan, magenta, and yellow values, as has been described.

The method 300 next scales the cyan, magenta, and yellow values for each pixel that have been determined by their corresponding scaling factors (318). For example, the scaling factors for cyan, magenta, and yellow may be the values C, M, and Y. The cyan, magenta, and yellow, for a given pixel may be the values c, m, and y. Therefore, the values c, m, and y are scaled by the scaling factors C, M, and Y by multiplication, such that the cyan, magenta, and yellow values c*C, m*M, and y*Y result. It is noted that at least one of the scaling factors C, M, and Y is equal to one, because for any of the differently colored inks having a greatest amount of ink remaining, the scaling factor is determined as this amount of ink remaining divided by this same amount. Therefore, the scaling performed in 318 is in effect only for those of the C, M, and Y values that correspond to inks having less than the greatest amount of ink remaining of any of the differently colored inks.

The scaled cyan, magenta, and yellow values, and the black value, for each pixel of the image to be printed on the next media sheet are finally converted back to red, green, and blue values (320). The conversion performed in 320 can be performed as has been described in relation to 220 of the method 200 of FIG. 2. The image is then printed on a media sheet (322). Printing of the image on the media sheet by a particular printing device may and typically will involve further conversion of the red, green, and blue values of the image, as have been modified, to cyan, magenta, yellow, and optionally black values, as specifically dictated by that particular printing device. That is, the modification of the red, green, and blue values of the image as performed in 312 to reduce or balance ink usage is performed prior to the actual approach by which a specific printing device converts the red, green, and blue values to cyan, magenta, yellow, and optionally black values for actually printing the image on a media sheet in 322.

Thus, the ink adjustment performed in 312 is independent of any specific inkjet printer, and independent of the manner by which a given inkjet printer actually and subsequently converts the modified red, green, and blue values of an image to cyan, magenta, yellow, and black values for printing purposes in 322, as has been described in more detail in relation to 222 of the method 200 of FIG. 2. Finally, if there are further media sheets on which the images are to be printed (324), then the method 300 is repeated for each additional media sheet, prior to printing an image on the next media sheet. Otherwise, the method 300 is finished (326).

Like the method 200 of FIG. 2, the method 300 is self-correcting, because the ink adjustment performed in 312 is performed before each media sheet has an image printed on it. If a given image consumes more than the determined amount of ink for a given color, then the method 300 will compensate for this extra ink consumption the next time the method 300 is repeated. Furthermore, like the ink adjustment performed in 212 of the method 200 of FIG. 2, the ink performed in 312 of the method 300 is accomplished without pre-scanning the image to be printed on the next sheet of media.

Figure 4:
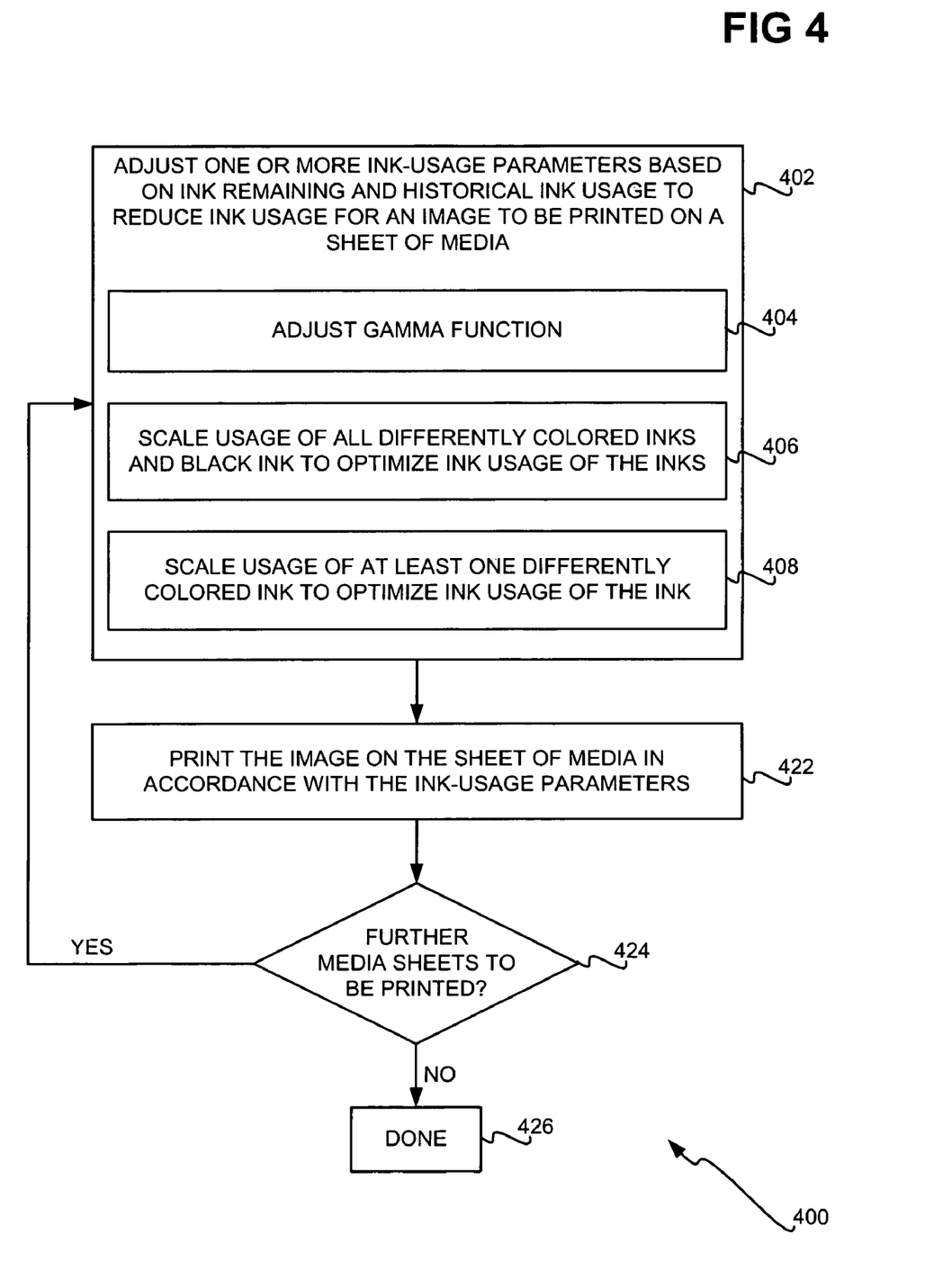
FIG. 4 is a flowchart of a method for adjusting ink-usage parameters to reduce or balance ink usage when printing images on media sheets, according to an embodiment of the invention, and which is more general than but consistent with the methods of FIGS. 2 and 3.

FIG. 4 is a flowchart of a method for adjusting ink-usage parameters to reduce or balance ink usage when printing images on media sheets, according to an embodiment of the invention, and which is more general than but consistent with the methods of FIGS. 2 and 3. Like the methods 200 and 300, the method 400 may be implemented in whole or in part as a computer program. The computer program may be performed by a host computing device to which a printing device is communicatively coupled, or by the printing device itself. The method 400 may in one embodiment be implemented in relation to the cartridge 100 of FIG. 1.

First, one or more ink-usage parameters are adjusted, based at least on the ink remaining and the historical or past ink usage for each differently colored ink, potentially including black ink (402). Such parameter adjustment is accomplished to reduce or balance ink usage for an image to be printed on a sheet of media. The ink-usage parameters can include scaling factors, including scaling factors for each differently colored ink, as well as a black scaling factor for black ink and/or overall reduction of all the differently colored inks where black ink is not present, and a gamma scaling factor, among other types of ink-usage parameters. The ink-usage parameters are adjusted in relation to an image to be printed on the next sheet of media.

In one embodiment, the adjustment in 402 is achieved by performing one or more of 404, 406, and 408. In 404, the gamma function that controls mid-tone lightening of the image to be printed on the sheet of media is adjusted, as has been described in relation to the method 200 of FIG. 2. In 406, usage of all the differently colored inks, such as cyan, magenta, and yellow ink, as well as optionally usage of black ink, are scaled to optimize ink usage of these inks, as has also been described in relation to the method 200 of FIG. 2. Such scaling of all of the differently colored inks, and optionally of the black ink, further maintains gray-axis neutrality of the image printed on the sheet of media. That is, the grayscale values of each pixel of the image are effectively adjusted in unison, so that the gray axis is not shifted. Finally, in 408, usage of at least one differently colored ink is scaled to optimize ink usage of the ink, as has been described in relation to the method 300 of FIG. 3.

The image is then printed on the next sheet of media (422). As has been described, printing of the image on the media sheet by a particular printing device may and typically will involve further conversion of the red, green, and blue values of the image, as have been modified, to cyan, magenta, yellow, and optionally black values, as specifically dictated by that particular printing device. The ink-usage parameters adjustment performed in 402 is independent of any specific inkjet printer, and thus independent of the manner by which a given inkjet printer actually and subsequently prints the image on the next sheet of media. If there are further media sheets on which the images are to be printed (424), then the method 400 is repeated for each additional media sheet, prior to printing an image on the next media sheet. Otherwise, the method 400 is finished (426).

Like the method 200 of FIG. 2 and the method 300 of FIG. 3, the method 400 is self-correcting, because the ink-usage parameter adjustment performed in 402 is performed before each media sheet has an image printed on it. Furthermore, like the ink adjustment performed in 212 of the method 200 and in 312 of the method 300, the ink-usage parameter adjustment performed in 402 of the method 400 is accomplished without pre-scanning the image to be printed on the next sheet of media. In one embodiment, the method 400, like the method 200, is performed to ensure that a supply of ink for each differently colored ink, including black ink, is sufficient to print images on a predetermined number of sheets of media. In another embodiment, the method 400, like the method 300, is performed to ensure that a supply of ink for each differently colored ink substantially runs out at about the same time.

Figure 5:
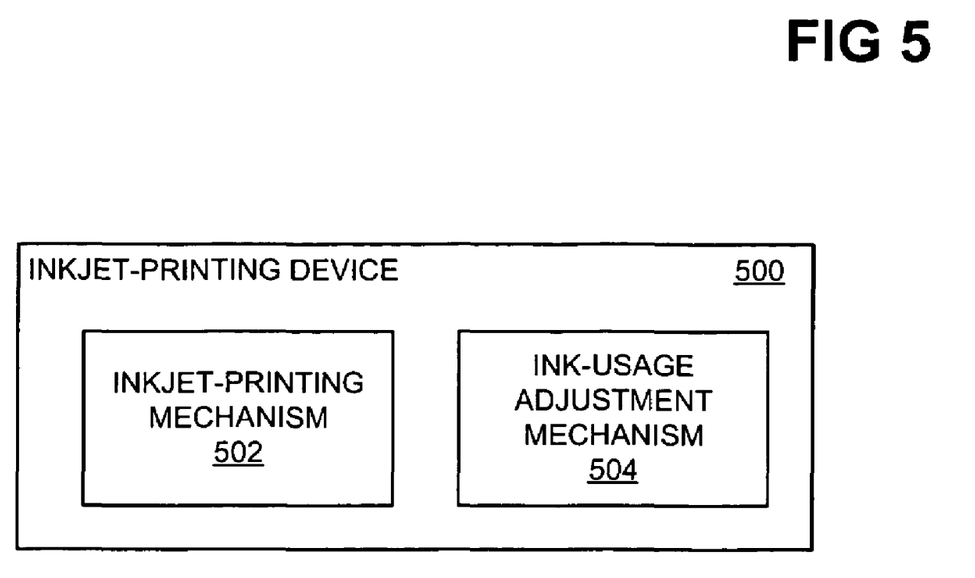
FIG. 5 is a rudimentary block diagram of an inkjet-printing device, according to an embodiment of the invention.

FIG. 5 shows a rudimentary block diagram of an inkjet-printing device 500, like an inkjet printer, according to an embodiment of the invention. The inkjet-printing device 500 is depicted in FIG. 5 as including an inkjet-printing mechanism 502 and an ink-usage adjustment mechanism 504. However, as can be appreciated by those of ordinary skill within the art, the device 500 may include other components, in addition to and/or in lieu of those depicted in FIG. 5.

The inkjet-printing mechanism 502 is capable of ejecting ink of different colors onto media sheets, like paper, to form images on the media sheets, where such images can include text, graphics, or a combination of text and graphics. The mechanism 502 includes those components needed to so eject ink onto media sheets. For example, the mechanism 502 may include inkjet printheads, advancement motors to advance the media sheets, and so on.

The ink-usage adjustment mechanism 504 is to, prior to the formation of an image on each media sheet by the inkjet-printing mechanism 502, adjust one or more ink-usage parameters. For example, the mechanism 504 may perform the method 200 of FIG. 2, the method 300 of FIG. 3, and/or the method 400 of FIG. 4 that have been described. The mechanism 504 may be implemented in hardware, software, or in a combination of hardware and software.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:
    determining an amount of ink needed to print images on a number of remaining sheets of media in a paper holding means for each of a plurality of differently colored inks;
    adjusting one or more ink-usage parameters based on ink remaining and historical ink usage to reduce ink usage for an image to be printed on a sheet of media with ink;
    printing the image on the sheet of media with the ink, in accordance with the ink-usage parameters; and,
    repeating adjustment of ink-usage parameters and printing an image on a sheet of media with the ink for each additional image to be printed on a sheet of media.

2. The method of claim 1, wherein adjusting the ink-usage parameters is accomplished in an inkjet printer-independent manner, such that adjustment of the ink-usage parameters is not dependent on an inkjet printer to be used to print the image on the sheet of media.

3. The method of claim 1, wherein adjusting the ink-usage parameters is accomplished without pre-scanning the image to be printed on the sheet of media.

4. The method of claim 1, wherein adjusting the ink-usage parameters comprises adjusting the parameters to ensure that a supply of ink for each of a plurality of differently colored inks is sufficient to print images on a predetermined number of sheets of media.

5. The method of claim 4, wherein the supply of ink for each of the plurality of differently colored inks is part of a same cassette including the predetermined number of sheets of media.

6. The method of claim 1, wherein adjusting the ink-usage parameters comprises adjusting the parameters to ensure that a supply of ink for each of a plurality of differently colored inks substantially runs out at about a same time.

7. The method of claim 6, wherein the supply of ink for each of the plurality of differently colored inks is part of a same cartridge.

8. The method of claim 1, wherein adjusting the ink-usage parameters comprises at least one of:
    adjusting a gamma function to control mid-tone lightening of the image printed on the sheet of media;
    scaling usage of at least one of a plurality of differently colored inks to optimize ink usage of each differently colored ink when printing the image on the sheet of media; and,
    scaling usage of all of the plurality of differently colored ink to maintain gray-axis neutrality of the image printed on the sheet of media.

9. The method of claim 8, where scaling usage of all of the plurality of different colored ink also comprises scaling usage of black ink.

10. A method comprising:
    determining an amount of ink needed to print images on a number of remaining sheets of media in a paper holding means for each of a plurality of differently colored inks;
    determining an amount of ink remaining for each differently colored ink;
    determining a scaling factor for each differently colored ink based on the amount of ink needed and the amount of ink remaining of the differently colored ink;
    determining a gamma scaling factor for mid-tone lightening of images printed on sheets of media, based on the scaling factors of the differently colored inks;
    determining a black scaling factor based on scaling factors of the differently colored inks; and, adjusting ink to be used to print an image on a sheet of media based on the scaling factor for each differently colored ink, the gamma scaling factor, and the black scaling factor.

11. The method of claim 10, further comprising:
printing the image on the sheet of media; and,
repeating the method for each of a plurality of other images to be printed on additional sheets of media.

12. The method of claim 10, wherein adjusting the ink to be used to print the image on the sheet of media comprises:
applying the gamma scaling factor to each of a plurality of red, green, and blue values of the image;
converting the red, green, and blue values of the image to a plurality of cyan, magenta, yellow, and black values of the image;
scaling the cyan, magenta, and yellow values of the image by the scaling factors for the differently colored inks, and the black values of the image by the black scaling factor; and,
converting the cyan, magenta, yellow, and black values of the image to new red, green, and blue values of the image.

13. The method of claim 10, wherein determining the ink needed to print images on the number of remaining sheets of media for each differently colored ink comprises at least one of:
multiplying an initial amount of the differently colored ink by the number of remaining sheets of media, and divided by a number of initial sheets of media;
determining the ink needed based on past printing of prior images on sheets of media; and,
padding the ink needed to print images on the number of remaining sheets of media for each differently colored ink by a predetermined amount.

14. The method of claim 10, wherein determining the amount of ink remaining for each differently colored ink comprises subtracting an already used amount of each differently colored ink from an initial amount the differently colored ink.

15. The method of claim 10, wherein determining the scaling factor for each differently colored ink comprises determining the scaling factor for each differently colored ink as a ratio of the amount of ink remaining to the amount of ink needed for the differently colored ink, where the ratio has a maximum value of one;
wherein determining the gamma scaling factor comprises determining the gamma scaling factor as a maximum value of the scaling factors for the differently colored inks plus a minimum value of the scaling factors for the differently colored inks, divided by two; and,
wherein determining the black scaling factor comprises determining the gamma scaling factor as a maximum value of the scaling factors for the differently colored inks plus a minimum value of the scaling factors for the differently colored inks, divided by two.

16. The method of claim 15, wherein adjusting the ink to be used to print the image on the sheet of media comprises:
multiplying the gamma scaling factor to each of a plurality of normalized red, green, and blue values of the image;
subtracting the normalized red, green, and blue values from a value of one to yield a plurality of cyan, magenta, and yellow values, respectively, of the image;
extracting a value from each of the cyan, magenta, and yellow values to yield a plurality of black values of the image;
multiplying the cyan, magenta, and yellow values of the image by the scaling factors for the differently colored inks and multiplying the black values of the image by the black scaling factor; and,
converting the cyan, magenta, yellow, and black values of the image to new red, green, and blue values of the image.

17. A method comprising:
determining an amount of ink needed to print images on a number of remaining sheets of media in a paper holding means for each of a plurality of differently colored inks;
determining an amount of ink remaining for each differently colored ink;
determining a scaling factor for each differently colored ink based on the amount of ink remaining for the differently colored ink and a greatest amount of ink remaining for any differently colored ink; and,
adjusting ink to be used to print an image on a sheet of media for each of less than all of the differently colored inks, based on the scaling factor for the differently colored ink.

18. The method of claim 17, further comprising:
printing the image on the sheet of media; and,
repeating the method for each of a plurality of other images to be printed on additional sheets of media.

19. The method of claim 17, wherein adjusting the ink to be used to print the image on the sheet of media comprises:
converting the red, green, and blue values of the image to a plurality of cyan, magenta, yellow, and black values of the image;
scaling the cyan, magenta, and yellow values of the image by the scaling factors for the differently colored inks, such that only each differently colored ink for which the amount of ink remaining is less than the greatest amount of ink remaining for any differently colored ink has corresponding values adjusted; and,
converting the cyan, magenta, yellow, and black values of the image to new red, green, and blue values of the image.

20. The method of claim 17, wherein determining the scaling factor for each differently colored ink comprises determining the scaling factor for each differently colored ink as a ratio of the amount of ink remaining for the differently colored ink to the greatest amount of ink remaining for any differently colored ink.

21. The method of claim 20, wherein adjusting the ink to be used to print the image on the sheet of media comprises:
subtracting normalized red, green, and blue values from a value of one to yield a plurality of cyan, magenta, and yellow values, respectively, of the image;
extracting a value from each of the cyan, magenta, and yellow values to yield a plurality of black values of the image;
multiplying a portion of the cyan, magenta, and yellow values of the image by the scaling factors for the differently colored inks, such that only each differently colored ink for which the amount of ink remaining is less than the greatest amount of ink remaining for any differently colored ink has corresponding values adjusted; and,
converting the cyan, magenta, yellow, and black values of the image to new red, green, and blue values of the image.

22. An inkjet-printing device:
an inkjet-printing mechanism capable of ejecting ink onto media sheets to form images on the media sheets; and, a mechanism to, prior to formation of an image on each media sheet by the inkjet-printing mechanism, determine an amount of ink needed to print images on a number of remaining sheets of media in a paper holding means for each of a plurality of differently colored inks and to adjust one or more ink-usage parameters based at least on ink remaining to reduce ink usage in the formation of the image on the media sheet.

23. The inkjet-printing device of claim 22, wherein the mechanism is to adjust the ink-usage parameters to ensure that a supply of ink for each of a plurality of differently colored inks is sufficient to form images on a predetermined number of media sheets.

24. The inkjet-printing device of claim 22, wherein the mechanism is to adjust the ink-usage parameters to ensure that a supply of ink for each of a plurality of differently colored inks substantially runs out at about a same time.

25. The inkjet-printing device of claim 22, wherein the mechanism is to apply a determined gamma scaling factor to each of a plurality of red, green, and blue values of the image to be formed on the media sheet, and to scale corresponding cyan, magenta, yellow, and black values of the image by corresponding scaling factors based on the amounts of ink remaining of the differently colored inks and amounts of ink needed of the differently colored inks to form images on a predetermined number of media sheets.

26. The inkjet-printing device of claim 22, wherein the mechanism is to scale color values of the image by corresponding scaling factors based at least on the amounts of ink remaining of the differently colored inks for only each differently colored ink for which the amount of ink remaining is less than a greatest amount of ink remaining for any differently colored ink.

27. An inkjet-printing device:
means for ejecting ink onto media sheets to form images on the media sheets; and,
means for determining an amount of ink needed to print images on a number of remaining sheets of media in a paper holding means for each of a plurality of differently colored inks and for adjusting one or more ink-usage parameters based at least on ink remaining to reduce ink usage in the formation of an image on each media sheet, prior to formation of the image on the media sheet.

28. The inkjet-printing device of claim 27, wherein the means for adjusting the ink- usage parameters is further for applying a determined gamma scaling factor to each of a plurality of red, green, and blue values of the image to be formed on the media sheet, and for scaling corresponding cyan, magenta, yellow, and black values of the image by corresponding scaling factors based on the amounts of ink remaining of the differently colored inks and amounts of ink needed of the differently colored inks to form images on a predetermined number of media sheets.

29. The inkjet-printing device of claim 27, wherein the means for adjusting the ink- usage parameters is further for scaling color values of the image by corresponding scaling factors based at least on the amounts of ink remaining of the differently colored inks for only each differently colored ink for which the amount of ink remaining is less than a greatest amount of ink remaining for any differently colored ink.

30. A computer-readable medium having a computer program stored thereon comprising:
a first computer program part to convert a plurality of red, green, and blue values of an image to be inkjet printed on a media sheet to a plurality of cyan, magenta, yellow, and black values;
a second computer program part to scale at least one of: cyan values of the image, magenta values of the image, yellow values of the image, and black values of the image by corresponding scaling factors based at least on amounts of correspondingly colored inks remaining;
a third computer program part to convert the cyan, magenta, yellow, and black values of the image to new red, green, and blue values of the image;
a fourth computer program part to cause the image, having the new red, green, and blue values, to be inkjet printed on the media sheet; and,
a fifth computer program part to determine an amount of ink needed to print images on a number of remaining sheets of media in a paper holding means for each of a plurality of differently colored inks.

31. The computer-readable medium of claim 30, further comprising a sixth computer program part to apply a determined gamma scaling factor to the red, green, and blue values of the image prior to the first computer program part scaling the red, green, and blue values of the image to the cyan, magenta, yellow, and black values of the image.

32. The computer-readable medium of claim 30, wherein the second computer program part is to scale all of the cyan, magenta, yellow, and black values of the image by the corresponding scaling factors.

33. The computer-readable medium of claim 30, wherein the second computer program part is to scale those of the cyan, magenta, and yellow values of the image for which the amount of correspondingly colored ink remaining is less than a greatest amount of colored ink remaining for any differently colored ink.

34. The computer-readable medium of claim 30, wherein the corresponding scaling factors are further based on amounts of the correspondingly colored inks needed to inkjet print images on a predetermined number of media sheets.

* * * * *

UNITED STATES PATENT AND TRADEMARK OFFICE
CERTIFICATE OF CORRECTION

PATENT NO. : 7,561,316 B2
APPLICATION NO. : 11/036821
DATED : July 14, 2009
INVENTOR(S) : Jay S. Gondek et al.

It is certified that error appears in the above-identified patent and that said Letters Patent is hereby corrected as shown below:

In column 8, line 24, delete "ink" and insert -- ink adjustment --, therefor.

In column 11, line 5, in Claim 11, delete "farther" and insert -- further --, therefor.

Signed and Sealed this

Third Day of November, 2009

David J. Kappos
*Director of the United States Patent and Trademark Office*